US008037206B2

United States Patent
Kit Tam et al.

(10) Patent No.: US 8,037,206 B2
(45) Date of Patent: *Oct. 11, 2011

(54) SYSTEM AND METHOD FOR PROVIDING CONFIGURABLE, DYNAMIC MULTIMEDIA MESSAGE SERVICE PRE-TRANSCODING

(75) Inventors: Derek Hung Kit Tam, Reston, VA (US); James C. Farrow, Frederick, MD (US); William H. Dudley, Lovettsville, VA (US); Thilo Rusche, Arlington, VA (US); Brian Jeffery Beggerly, Washington, DC (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/502,836

(22) Filed: Jul. 14, 2009

(65) Prior Publication Data

US 2009/0291697 A1    Nov. 26, 2009

Related U.S. Application Data

(63) Continuation of application No. 11/651,053, filed on Jan. 9, 2007, now abandoned, and a continuation of application No. 10/706,975, filed on Nov. 14, 2003, now Pat. No. 7,181,538.

(51) Int. Cl.
*G06F 15/16* (2006.01)
(52) U.S. Cl. ........ 709/246; 709/206; 709/239; 709/249; 455/412.2; 455/414.4; 455/466; 379/88.13; 379/93.01
(58) Field of Classification Search ................... 709/206, 709/238, 239, 246, 249; 379/88.13, 93.01; 455/412, 414.4, 466
See application file for complete search history.

(56) References Cited

U.S. PATENT DOCUMENTS 5,321,727 A    6/1994 Bonnet et al.
(Continued)

FOREIGN PATENT DOCUMENTS

EP    0777394 A1    6/1997
(Continued)

OTHER PUBLICATIONS

Miraj-E-Mostafa, MMS—The Modern Wireless Solution for Multimedia Messaging, Personal, Indoor and Mobile Radio Communications, 2002. vol. 5, Sep. 15, 2002, pp. 2466-2472.
(Continued)

*Primary Examiner* — Oanh Duong
(74) *Attorney, Agent, or Firm* — Edell, Shapiro & Finnan, LLC

(57) ABSTRACT

System and methods for providing multimedia message service (MMS) interoperability between an initiating carrier and a destination carrier. A transcoding facility receives an MMS message from an initiating carrier and accesses a number portability database to determine an identity of a destination carrier to which the MMS message is intended to be sent and a carrier profile repository to obtain a carrier profile for the destination carrier, the carrier profile including information regarding an MMS format acceptable to the destination carrier. The transcoding facility determines, based on the carrier profile and a format of the MMS message received from the initiating carrier, whether the format of the MMS message received from the initiating carrier must be modified to be effectively received by the destination carrier and, if so, transcodes the MMS message in accordance with the carrier profile to generate a transcoded MMS message, and thereafter sends one of (i) the MMS message received from the initiating carrier and (ii) the transcoded MMS message to the destination carrier.

10 Claims, 2 Drawing Sheets

U.S. PATENT DOCUMENTS

| | | | |
|---|---|---|---|
| 5,351,235 | A | 9/1994 | Lahtinen |
| 5,768,509 | A | 6/1998 | Gunluk |
| 5,887,249 | A | 3/1999 | Schmid |
| 5,894,478 | A | 4/1999 | Barzegar et al. |
| 6,021,126 | A | 2/2000 | White et al. |
| 6,208,870 | B1 | 3/2001 | Lorello et al. |
| 6,230,009 | B1 | 5/2001 | Holmes et al. |
| 6,240,293 | B1 | 5/2001 | Koster |
| 6,327,267 | B1 | 12/2001 | Valentine et al. |
| 6,366,663 | B1 | 4/2002 | Bauer et al. |
| 6,421,733 | B1 | 7/2002 | Tso et al. |
| 6,535,746 | B1 | 3/2003 | Yu et al. |
| 6,560,226 | B1 | 5/2003 | Torrey et al. |
| 6,594,255 | B1 | 7/2003 | Neuman |
| 6,658,260 | B2 | 12/2003 | Knotts |
| 6,738,630 | B2 | 5/2004 | Ashmore |
| 6,772,267 | B2 | 8/2004 | Thaler et al. |
| 6,848,008 | B1 | 1/2005 | Sevanto et al. |
| 6,947,738 | B2 | 9/2005 | Skog et al. |
| 7,069,301 | B2 | 6/2006 | Jerbi et al. |
| 7,127,489 | B2 | 10/2006 | Aho |
| 7,133,687 | B1 | 11/2006 | El-Fishawy et al. |
| 7,181,231 | B2 | 2/2007 | Le Bodic et al. |
| 7,181,538 | B2 | 2/2007 | Tam et al. |
| 2002/0015403 | A1 | 2/2002 | McConnell et al. |
| 2002/0029189 | A1 | 3/2002 | Titus et al. |
| 2002/0112014 | A1 | 8/2002 | Bennett et al. |
| 2002/0167909 | A1 | 11/2002 | Balazinski et al. |
| 2003/0033312 | A1* | 2/2003 | Koizumi et al. ............... 707/100 |
| 2003/0040300 | A1* | 2/2003 | Bodic et al. .................... 455/412 |
| 2003/0083078 | A1 | 5/2003 | Allison et al. |
| 2003/0109269 | A1* | 6/2003 | Laumen et al. ............... 455/466 |
| 2003/0118027 | A1 | 6/2003 | Lee et al. |
| 2003/0158902 | A1 | 8/2003 | Volach |
| 2003/0202521 | A1 | 10/2003 | Havinis et al. |
| 2003/0227977 | A1 | 12/2003 | Henocq |
| 2004/0032856 | A1 | 2/2004 | Sandstrom |
| 2004/0078439 | A1 | 4/2004 | Staack |
| 2004/0156495 | A1 | 8/2004 | Chava et al. |
| 2004/0162818 | A1 | 8/2004 | Shaw |
| 2004/0185883 | A1 | 9/2004 | Rukman |
| 2004/0255041 | A1 | 12/2004 | Wen et al. |
| 2004/0266411 | A1 | 12/2004 | Galicia et al. |
| 2005/0027741 | A1 | 2/2005 | Eichstaedt et al. |
| 2005/0064883 | A1 | 3/2005 | Heck et al. |
| 2006/0031297 | A1 | 2/2006 | Zuidema |

FOREIGN PATENT DOCUMENTS

| | | |
|---|---|---|
| EP | 0959600 A1 | 11/1999 |
| EP | 1289322 A1 | 3/2003 |
| WO | WO9720442 | 6/1997 |
| WO | WO9736434 | 10/1997 |
| WO | WO9911078 | 3/1999 |
| WO | WO9933226 | 7/1999 |
| WO | WO0041533 | 7/2000 |
| WO | WO0225875 | 3/2002 |
| WO | 03021982 A1 | 3/2003 |

OTHER PUBLICATIONS

Digital cellular telecommunications system (Phase2+); Universal Mobile Telecommunications System (UMTS); Support of GSM Mobile Number Portability (MN); stage 2 93GPP TS 23.066 version 5.1.0 Release 5); ETSI TS 123 066 , vol. 3-CN2; 3-CN4, No. V5.1.0, Jun. 1, 2003 pp. 45-46, 49-56.

Digital cellular telecommunications system (Phase 2+); Universal Mobile Telecommunications System (UMTS); Multimedia Messaging Service (MMS); Functional description; Stage 2 (3GPP TS 23.140 version 5.8.0 Release 5); ETSI TS 123 140, vol. 3-T2, No. V5.8.0, Sep. 1, 2003.

Supplementary European Search Report, EP04789365 (6 pages).

GSM, ARIB STD-T63-23.140 V5.11.0 Multimedia Messaging Service (MMS); Functional description stage 2, (release 5).

* cited by examiner

SYSTEM AND METHOD FOR PROVIDING CONFIGURABLE, DYNAMIC MULTIMEDIA MESSAGE SERVICE PRE-TRANSCODING

This is a continuation of U.S. patent application Ser. No. 11/651,053, filed Jan. 9, 2007, which is a continuation of U.S. patent application Ser. No. 10/706,975, filed Nov. 14, 2003, now U.S. Pat. No. 7,181,538, both of which are herein incorporated by reference in their entireties.

BACKGROUND

1. Field of the Invention

The present invention relates generally to improvements in mobile telephone networks' Multimedia Message Service (MMS) offerings. More specifically, the present invention is related to systems and methods that support the definition, management, and application of configurable pre-transcoding operations as they relate to MMS.

2. Background of the Invention

In North America, and many other parts of the world, mobile telecommunication networks are characterized by different standards such as TDMA, CDMA, GSM, iDEN and many variants thereof, such as 2G (Second Generation Networks) and 3G (Third Generation Networks). The standards typically specify the radio interface characteristics, equipment details and associated number schemes, applicable communication protocols including the associated message definitions and characteristics of inter-connecting networks. While some of the concepts are common among these disparate standards, the commonality of the concepts is not sufficient to make devices belonging to one network talk to devices belonging to another network for wireless messaging needs.

A telecommunication network supports many services. Primary among them are voice calls and messaging. Aspects of the present invention primarily concern messaging and, therefore, this description concentrates on expanding upon the state of messaging standards.

The wireless messaging revolution started primarily with the GSM standard with the introduction of Short Message Service (SMS). An SMS message can have a maximum of 160 characters (140 octets) and is used for a number of applications including person to person messaging, binary content such as ring tones, person to application messaging and a number of other uses. Almost all other standards such as ANSI TDMA and CDMA wireless networks also have implemented an equivalent form of short message support within their networks.

There are other forms of messaging such as EMAIL, WAP and, more recently, Multimedia messages (MMS). In some cases, one form of messaging is carried over the bearers of other forms of messaging. For example, an EMAIL message could be implemented with SMS as a bearer service.

In general, it is not easily possible to exchange messages across different networks supporting different wireless standards. SMS messaging has become very popular in Europe and other parts of the world due to implementation of the GSM standard in many networks, which makes it possible to exchange SMS messages easily across the networks. In the case of ANSI TIA/EIA 41 standards, such an exchange has not been possible until aspects of the present invention were put in place in North America in the year 2001.

The exchange of messages across different networks is further complicated by roaming, number portability, quality of service, "spam", and billing requirements. Due to its very nature, mobile networks permit roaming of subscriber units within the network and other networks implementing compatible standards, provided a business arrangement between the effected networks exists. In order to deliver a message to a mobile unit, it is necessary to find its current location and associated gateway and interface address.

One of the features of number portability is the ability to port a number from one service provider to another. Number portability poses problems with the delivery of messages when relatively static routing tables are used. A similar but independent problem arises out of "number range contamination". In North America, for example, messages and calls are routed to networks using what is known as NPA/NXX ranges. This methodology refers to routing of calls using the first 6 digits of the telephone number (TN) in the North American Number Plan (NANP). Traditionally, a set of number ranges segmented by NPA/NXX are assigned to service providers.

Recently, in the United States, a change has been made in telephone number range assignments to service providers. Instead of the usual 6 digit number ranges, the assignments are made, now, using 7 digit ranges. However, during the reassignment, certain numbers in a range may be, what is termed as, "contaminated," where a small percentage of numbers may belong to one service provider, even though the range as a whole is owned by another service provider.

In addition to the contaminated and ported number issues mentioned above, there are a number of other inter-connectivity issues that may need to be addressed for flexible and reliable message bridging across different networks. For example, a source and destination network (with respect to a message going between subscribers of those two networks) may be inter-connected by more than one Intermediate network. The routing tables and associated methodologies must account for this multi-hop connection. A destination network may be accessible only through a designated service provider to the network. For example, a SS7 service provider may have exclusive access to a carrier's network and the message must be routed through such a connection. There may be multiple types of connections to a network to reach the same mobile subscriber. Further, there may be multiple instances of a particular type of connection to a network to reach the same mobile subscribers.

In addition, there might be varying levels of Quality of Service for multiple connections to the same network.

To summarize, the following are many of the challenges that need to be addressed for successful and reliable message exchange between disparate wireless networks:

Protocol Conversion—ability to account for protocol differences

Transmission network support—ability to connect with the right kind of transmission network Inter-Domain or Inter-network Addressing Conversion—ability to perform address translation, as necessary Dynamic Routing Lookup—ability to resolve for accurate and timely routing information Message Transformation—ability to transform messages based on business and technical needs Storage and re-transmittal—ability to store and forward based on business and technical needs Recording of transmission events for billing and other uses—ability to record the message transmission events Management channel support—ability to manage message transmission Anti-spam, Authentication and other centralized value add services—ability to provide network protection.

Lateral transmission to other Intermediary networks—ability to interface with multiple networks Transaction support—ability to reliably transact a message delivery attempt Quality of Service—ability to support varying quality levels in providing service As previously mentioned, MMS is a follow-on to the wildly-successful Short Message Service (SMS) or 'text messaging' communication channel. As an initial point of reference, the WebOpedia on-line technical dictionary defines MMS as:

a store-and-forward method of transmitting graphics, video clips, sound files and short text messages over wireless networks using the WAP protocol. Carriers deploy special servers, dubbed MMS Centers (MMSCs) to implement the offerings on their systems. MMS also supports e-mail addressing, so the device can send e-mails directly to an e-mail address. The most common use of MMS is for communication between mobile phones.

As MMS services have emerged, so too have a plurality of MMSC vendors (e.g., LogicaCMG, OpenWave, Nokia, among others). While, in general, each MMSC vendor strives to develop its platform to a set of publicly-available definitional standards, vendor-specific implementation nuances or differences inevitably arise. Those nuances or differences (relating to, as an example, specific messaging protocol support) are then magnified by each wireless carrier's own unique implementation of a vendor's MMSC platform within a carrier's network (involving, as an example, acceptable message size, image type, etc.). These factors, in the end, yield a significant inter-carrier or cross-carrier interoperability challenge.

BRIEF SUMMARY OF THE INVENTION

The present invention addresses inter-carrier or cross-carrier interoperability. As noted previously, MMS messages contain message payloads that include information that is more complicated than simple SMS text, and, consequently, present significantly greater challenges. To attain a resolution to these interoperability challenges, the present invention provides a facility whereby configurable message content transformation operations may be dynamically realized.

In a preferred embodiment, the present invention provides a transcoding facility that first determines to which carrier an incoming MMS message is intended to be directed, and then pulls appropriate carrier profile information to effect the desired transcoding of the MMS message. Once transcoding is complete, the modified message is forwarded to the carrier that was previously identified. The present invention thus make it possible to seamlessly interconnect carriers that may have implemented MMS in somewhat different ways.

In one possible implementation, the transcoding facility is combined with an intermediary operating between carriers to facilitate interoperability of SMS messages. One such intermediary is described in U.S. Ser. No. 10/426,662, "Systems and Methods for Interconnecting Heterogeneous Networks," filed May 1, 2003, which is incorporated herein by reference.

The features and attendant advantages thereof will be more fully appreciated upon a reading of the following detailed description in conjunction with the accompanying drawings.

DETAILED DESCRIPTION OF THE INVENTION

Figure 1:
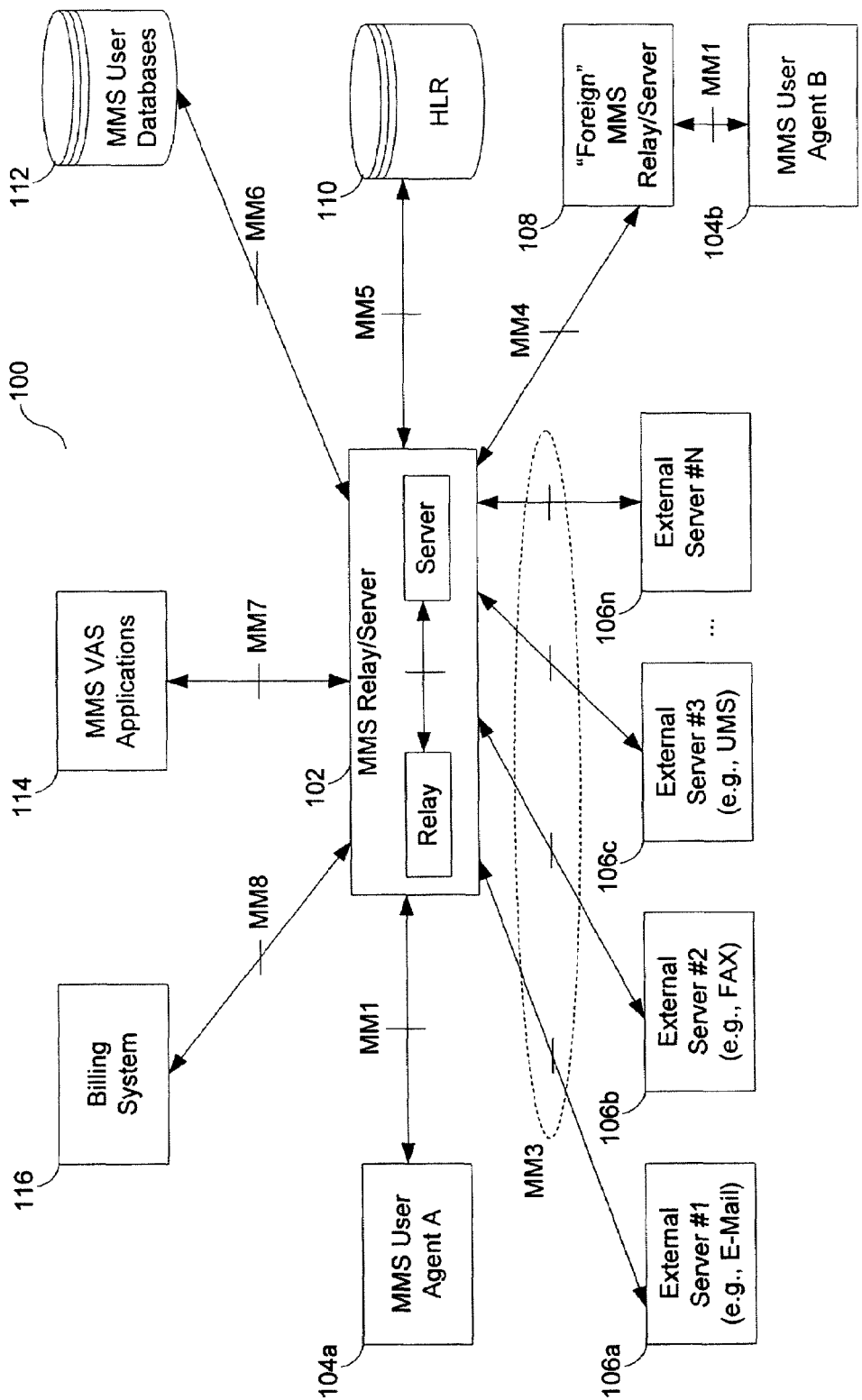
FIG. 1 is a schematic representation of an MMS Reference Architecture.

FIG. 1 is an exemplary MMS architecture 100 defined by the TS 23.140 specification from the Third Generation Partnership Project (3 GPP), which is incorporated herein by reference. Architecture 100 includes a plurality of interfaces, MM1-MM8, to allow communication between various entities within the structure. Central to architecture 100 is an MMS relay server 102. Relay server 102 is essentially a hub through which most, if not all, communication within architecture 100 is routed.

Reference point MM1 is used to submit Multimedia Messages (MMs) from MMS User Agent 104a to MMS Relay/Server 102, to let MMS User Agent 104a pull MMs from MMS Relay/Server 102, let MMS Relay/Server 102 push information about MMs to MMS User Agent 104a as part of an MM notification, and to exchange delivery reports between MMS Relay/Server 102 and MMS User Agent 104a. In addition to such a direct connection, reference point MM4 between a foreign MMS Relay/Server 108 belonging to different MMSEs and server 102 is used to transfer data between server 102 and MMS User Agent 104b.

Reference point MM3 is used by MMS Relay/Server 102 to send Multimedia Messages to and retrieve MMs from servers of external (legacy) messaging systems that are connected to the service provider's MMS Relay/Server, for example external servers 106a, 106b, 106c . . . 106n.

Reference point MM5 may be used to provide information to MMS Relay/Server 102 about the subscriber contained in Home Location Register (HLR) 110. Similarly, MM6 may be used to transfer information between MMS Relay/Server 102 and MMS User Database 112.

Reference point MM7 is used to transfer MMs from MMS Relay/Server 102 to MMS VAS applications 114 and to transfer MMs from MMS VAS applications 114 to MMS Relay/Server 102. Reference point MM8 allows communication between billing system 116 and MMS/Relay Server 102. Reference architecture 100 is merely disclosed as an exemplary architecture that could be utilized in conjunction with the present invention. One of ordinary skill in the art would understand that additional elements could be added or that some of the elements pictured may not be present along with any combination of additions and deletions.

Despite agreements among vendors with respect to standards such as TS 23.140, nuances or differences inevitably arise in actual implementations of different vendors' MMSC platforms. These vendor nuances or differences (relating to, as an example, specific MM4 support) are then magnified by each wireless carrier's own unique implementation of a vendor's MMSC platform within a carrier's network (involving, as an example, acceptable message size, image type, etc.). These factors, in the end, yield a significant inter-carrier or cross-carrier interoperability challenge—e.g., a first carrier's MMSC implementation may likely face a not-insignificant set of interoperability issues when trying to communicate with a second carrier's MMSC implementation. These carriers may also face an altogether different set of interoperability issues when trying to communicate with a third carrier's MMSC implementation and may face yet another set of interoperability issues when trying to communicate with a fourth carrier's MMSC implementation.

Since, as noted previously, MMs convey message payloads that contain information of a kind well beyond simple text, the interoperability challenges just described become substantive indeed. To address the myriad interoperability issues, the present invention employs transcoding. The "WebOpedia" on-line technical dictionary defines transcoding as:

> The process of converting a media file or object from one format to another. Transcoding is often used to convert video formats (i.e., Beta to VHS, VHS to QuickTime, QuickTime to MPEG). But it is also used to fit HTML files and graphics files to the unique constraints of mobile devices and other Web-enabled products. These devices usually have smaller screen sizes, lower memory, and slower bandwidth rates. In this scenario, transcoding is performed by a transcoding proxy server or device, which receives the requested document or file and uses a specified annotation to adapt it to the client.

Enabling universal access to multimedia content is important for the success of MMS. Universal access describes the way in which multimedia content is adapted to the constraints of another device. For example, if one phone has a screen size bigger than another, then the image has to be optimized in order for it to be displayed properly. Similarly if one phone supports GIF and the other only supports JPG the format would have to be changed and optimized in order for it to be displayed correctly.

Essentially, what happens is that content is tailored before it arrives at the other device. This tailoring process is called transcoding. Transcoding systems can adapt video, images, audio and text to the individual constraints of different devices. Content is summarized, translated and converted, on the fly.

Transcoding is particularly important in the mobile world not just for interoperability issues, but also due to the current bandwidth limitations. Downloading images and movies onto an MMS phone may well take a few minutes, which is not always acceptable in certain situations. Transcoding can reduce file sizes whilst optimizing them. This allows the user experience to be maximized, due to the download time being minimal.

Legacy support can also be achieved using a transcoder. This allows MMS messages to be sent to legacy device, albeit in a downgraded form (e.g. without color and depth). This allows legacy devices to experience an MMS message, after it has been converted to a relevant format, e.g. EMS. Some transcoders then allow that legacy device to forward on the message to an MMS device, and it will be displayed correctly.

Transcoding, as employed in accordance with the present invention ensures interoperability, which means an MMS message will look as the author intended it, no matter what device it is sent from or to. Without good interoperability the user experience will be nullified. If a picture is sent via MMS, the user desires that it look exactly as it did when sent. If this is not the case, this user is less likely to send an MMS picture again. The same applies to sound, and video. MMS interoperability is therefore a must. Users want a service similar to SMS. The use of transcoders in accordance with the present invention can make MMS interoperability similar to SMS interoperability, such that sending an MMS message to another MMS device will be virtually seamless.

Transcoding directly affects what the end users see and hear. This means it is a reflection of the MMS service as a whole. Therefore a good transcoding solution is important to the success of MMS.

To help facilitate resolution of the previously identified interoperability challenges, the present invention provides a facility whereby configurable destination carrier-specific transcoding (message content transformation) operations may be dynamically realized. In general, the present invention supports the maintenance or preservation of the highest possible end user experience while facilitating resolution of the instant interoperability challenges.

Figure 2:
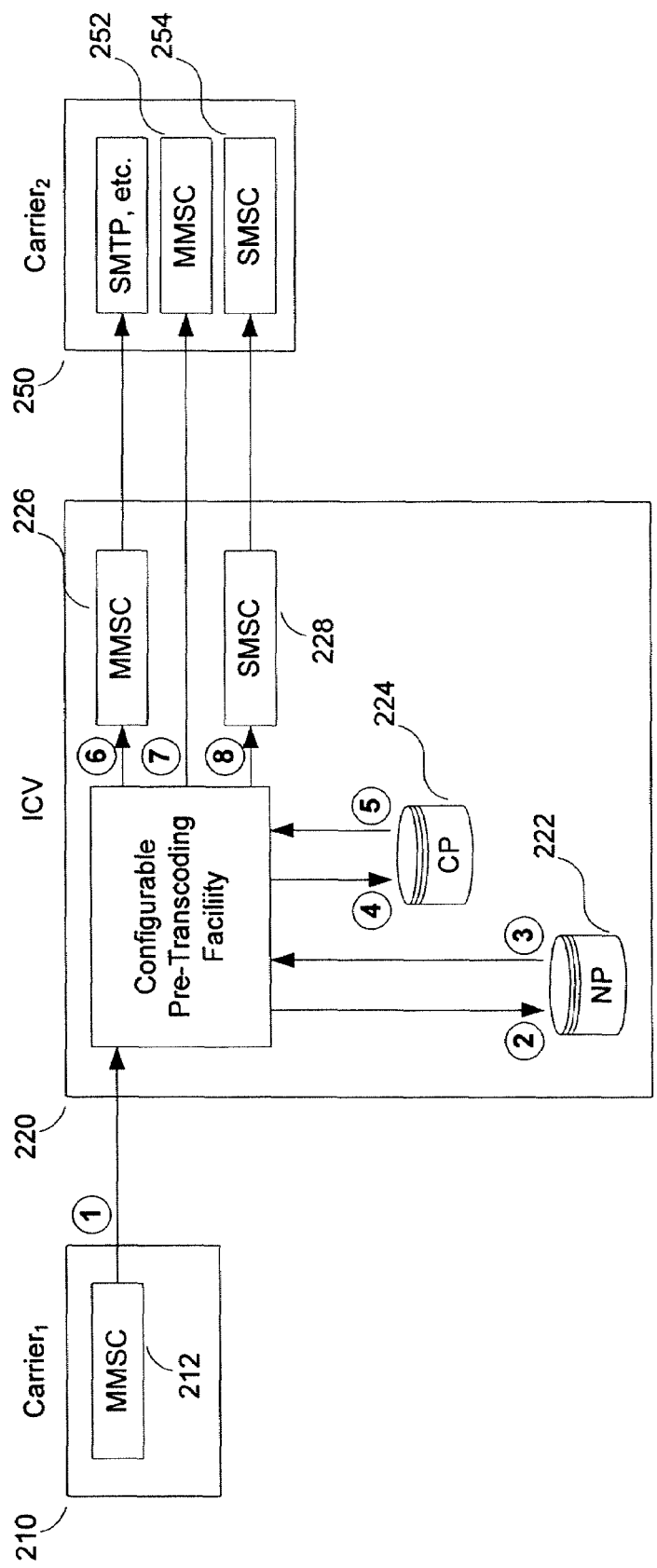
FIG. 2 is a diagram showing how an MMS message may be transferred from one carrier to another according to an exemplary embodiment of the present invention.

As seen in FIG. 2, an MMS message is received from a source carrier 210 (Carrier$_1$) by an Inter-Carrier Vendor (ICV) 220, appropriately processed (including, if applicable, the application of a configurable pre-transcoding operation), and then dispatched to the destination carrier (Carrier$_2$) 250 for delivery to the destination address. In one possible implementation, ICV 220 is a facility that is itself encompassed within an intermediary facility like that described in U.S. Ser. No. 10/426,662, "Systems and Methods for Interconnecting Heterogeneous Networks," filed May 1, 2003, which is incorporated herein by reference.

ICV 220 receives an MMS message from Carrier.sub.1's MMSC platform 212 via, e.g., MM4, as described in relation to FIG. 1. ICV 220 queries a Number Portability (NP) database 222 to authoritatively determine the identity of the carrier that currently is associated with (i.e., currently services) the address that is identified as the destination of the MMS message. The identity of destination carrier (Carrier$_2$) 250 is returned. ICV 220 then queries a Carrier Profile (CP) repository 224 for the CP for destination carrier (Carrier$_2$) 250. The profile for destination carrier (Carrier$_2$) 250 is then returned.

At this point, the content or the payload of the instant MMS message is examined vis-a-vis the returned CP and a series of processing decisions are dynamically made. Through examination of the destination carrier's CP, ICV 220 may query whether the destination carrier 250 is able to accept the instant MMS message as-is. If the answer to this inquiry is 'Yes' then the MMS message may be delivered to the destination carrier's MMSC platform 252 via MM4. If the answer to this inquiry is 'No' then ICV 220 may iterate through the entries in the CP (in a defined, for example ranked or weighted, manner). ICV 220 then determines if a pre-transcoding operation is applicable to the current situation. If the answer to this inquiry is 'No' then a 'best possible routing' model is employed and the instant MMS message is delivered to the destination carrier's legacy facility (not depicted) through ICV's 220 MMSC platform 226 via MM3. Alternatively, an informational SMS message may be delivered to the destination carrier's SMS Center (SMSC) 254 via, for example, Short Message Peer-to-Peer (SMPP) from SMSC 228 of ICV 220.

If the answer to the previous inquiry (pre-transcoding operation applicable?) is 'Yes' then ICV 220 performs the appropriate pre-transcoding operation and delivers the instant MMS message to the destination carrier's MMSC platform 252 via MM4. It is important to note that there could be a variety of other processing sequences, decision trees, etc. that can be implemented within the context of the present invention.

Central to the present invention is the concept of a Carrier Profile (CP). A carrier profile is a highly flexible, easily extensible hierarchy of definitional information that is specific to, or applicable to, a given carrier. Carrier profiles are stored within an appropriate back-end repository. For example, one embodiment of the present invention might employ carrier profiles that contain the following exemplary information:

Carrier
    Top-level Constraints (overall size, etc.)
    .
    .
        Device Type

| |
|---|
| Content Type |
|    Content Size |
|       Particulars (delivery protocol[s], color depth, encoding, etc.) |

Those skilled in the art will appreciate that there could be multiple entries for each of the different 'levels' up and down the hierarchy. It is important to note that there are many other arrangements possible within the context of the present invention. Additionally, it should be noted that the implementation of an ICV's CP repository loading/update process may include any number of channels or avenues, including manual (e.g., through command-line utilities or a Web-based user interface) and automatic (e.g., the programmatic exchange of data files or an on-line/real-time data feed or), involving both the ICV and the involved carriers (Carrier$_1$, Carrier$_2$, Carrier$_n$).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing Multimedia Message Service (MMS) interoperability between a first mobile telephone service provider and a second mobile telephone service provider, comprising:
   receiving via MM4 an incoming MMS message from a Multimedia Message Service Center (MMSC) of the first mobile telephone service provider, the incoming MMS message (a) having originally been initiated by a user of a mobile telephone and (b) comprising content and a destination address;
   querying, using the destination address of the incoming MMS message, a number portability repository to determine an identity of the second mobile telephone service provider to which the incoming MMS message is intended to be sent;
   querying, using the identity of the second mobile telephone service provider, a carrier profile repository to access a previously-stored carrier profile for the second mobile telephone service provider, the carrier profile comprising information regarding content acceptable to the second mobile telephone service provider;
   performing, responsive to at least aspects of the carrier profile and the content of the incoming MMS message, one or more of the following processing steps:
   a) if the second mobile telephone service provider can accept the incoming MMS message as is then sending via MM4 the incoming MMS message to a MMSC of the second mobile telephone service provider, or
   b) if transcoding is applicable then (i) transcoding the incoming MMS message, in accordance with aspects of the carrier profile, to generate a transcoded MMS message and (ii) sending the transcoded MMS message to a MMSC of the second mobile telephone service provider, or
   c) (i) sending the incoming MMS message to a legacy facility of the second mobile telephone service provider or (ii) sending via Short Message Peer-to-Peer a Short Message Service message to a Short Message Service Center of the second mobile telephone service provider.

2. The method of claim 1, wherein the carrier profile repository contains carrier profiles for a plurality of carriers.

3. The method of claim 1, further comprising sending an email message to the second mobile telephone service provider to alert an intended recipient of a received MMS message.

4. A system for providing Multimedia Message Service (MMS) interoperability between a first mobile telephone service provider and a second mobile telephone service provider, comprising:
   a transcoding facility configured to receive an incoming MMS message from a Multimedia Message Service Center (MMSC) of the first mobile telephone service provider, the incoming MMS message (a) having originally been initiated by a user of a mobile telephone and (b) comprising a content and a destination address;
   a number portability repository in communication with the transcoding facility and configured to determine, based on the destination address of the incoming MMS message, an identity of the second mobile telephone service provider to which the incoming MMS message is intended to be sent;
   a carrier profile repository also in communication with the transcoding facility and configured to access, based on the identity of the second mobile telephone service provider, a previously-stored carrier profile for the second mobile telephone carrier, the carrier profile comprising information regarding content acceptable to the second mobile telephone service provider;
   the transcoding facility, responsive to at least aspects of the carrier profile and the content of the incoming MMS message, configured to perform one or more of the following processing steps:
   a) if the second mobile telephone service provider can accept the incoming MMS message as is then send via MM4 the incoming MMS message to a MMSC of the second mobile telephone service provider, or
   b) if transcoding is applicable then (i) transcode the incoming MMS message, in accordance with aspects of the carrier profile, to generate a transcoded MMS message and (ii) send via MM4 the transcoded MMS message to a MMSC of the second mobile telephone service provider, or
   c) (i) send via MM3 the incoming MMS message to a legacy facility of the second mobile telephone service provider or (ii) send via Short Message Peer-to-Peer a Short Message Service message to a Short Message Service Center (SMSC) of the second mobile telephone service provider.

5. The system of claim 4, wherein the carrier profile repository contains carrier profiles for a plurality of carriers.

6. The system of claim 4, further comprising sending an email message to the second mobile telephone service provider to alert an intended recipient of a received MMS message.

7. A method for providing Multimedia Message Service (MMS) interoperability between a first mobile telephone service provider and a second mobile telephone service provider, comprising:

receiving an incoming MMS message from a Multimedia Message Service Center of the first mobile telephone service provider, the incoming MMS message (a) having originally been initiated by a user of a mobile telephone and (b) comprising content and a destination address;

querying, using the destination address of the incoming MMS message, a number portability repository to determine an identity of the second mobile telephone service provider to which the incoming MMS message is intended to be sent;

querying, using the identity of the second mobile telephone service provider, a carrier profile repository to access a previously-stored carrier profile for the second mobile telephone service provider, the carrier profile comprising information regarding content acceptable to the second mobile telephone service provider;

transcoding the incoming MMS message, in accordance with aspects of the carrier profile, to generate a transcoded MMS message, the transcoded MMS message taking the form of an email message; and sending the transcoded MMS message to the second mobile telephone service provider.

8. The method of claim 7, wherein the carrier profile repository contains carrier profiles for a plurality of carriers.

9. A system for providing Multimedia Message Service (MMS) interoperability between a first mobile telephone service provider and a second mobile telephone service provider, comprising:

a transcoding facility configured to receive an incoming MMS message from a Multimedia Message Service Center of the first mobile telephone service provider, the incoming MMS message (a) having originally been initiated by a user of a mobile telephone and (b) comprising content and a destination address;

a number portability repository in communication with the transcoding facility and configured to determine, based on the destination address of the incoming MMS message, an identity of the second mobile telephone service provider to which the incoming MMS message is intended to be sent;

a carrier profile repository also in communication with the transcoding facility and configured to access, based on the identity of the second mobile telephone service provider, a previously-stored carrier profile for the second mobile telephone carrier, the carrier profile comprising information regarding content acceptable to the second mobile telephone service provider;

the transcoding facility (a) transcoding the incoming MMS message, in accordance with aspects of the carrier profile, to generate a transcoded MMS message, the transcoded MMS message taking the form of an email message, and (b) sending via MM3 the transcoded MMS message to the second mobile telephone service provider.

10. The system of claim 9, wherein the carrier profile repository contains carrier profiles for a plurality of carriers.

\* \* \* \* \*